June 12, 1934.  H. A. WIENEKE  1,962,542
FILTER
Filed Sept. 24, 1931

Inventor:
HENRY A. WIENEKE,
By John H. Bruninga
His Attorney.

Patented June 12, 1934

1,962,542

UNITED STATES PATENT OFFICE 1,962,542

FILTER

Henry A. Wieneke, St. Louis, Mo.

Application September 24, 1931, Serial No. 564,743

3 Claims. (Cl. 210—169)

This invention relates generally to filters, and particularly to filters which are adapted for use in the filtration of acid or other strongly corrosive materials.

In filtering such materials as contain corrosive substances, as for instance sulphuric acid, difficulty has heretofore been encountered in providing a suitable filtering material which will withstand the corrosive action of the strong chemicals. Semi-acid proof filters generally consist of a cloth formed by weaving acid resistant material, as for example asbestos fibers, into a supporting structure of less acid resistant threads or wires which provide structural strength, but it is apparent that such a filtering material as this is of no longer life than the life of the cotton threads or other supporting structure. Furthermore, with the use of such semi-acid proof materials, the acid proof fibers thereof are incapable of use without being again woven into the supporting structure, and accordingly even if such a filter were of sufficiently long life that it would become clogged, it cannot be cleaned and prepared for reuse for the reason that the entire supporting structure would be destroyed by such reconditioning.

The object of the present invention is to provide a filter structure substantially acid resisting in its entirety.

Another object of this invention is to provide an acid resisting filter from which the filtering material may be removed and cleansed.

A more specific object of this invention is to provide a filter having relatively small recesses adapted to receive fibrous filter material.

Other objects will become apparent to those skilled in the art when the following description is read in connection with the accompanying drawing in which.

Figure 1:
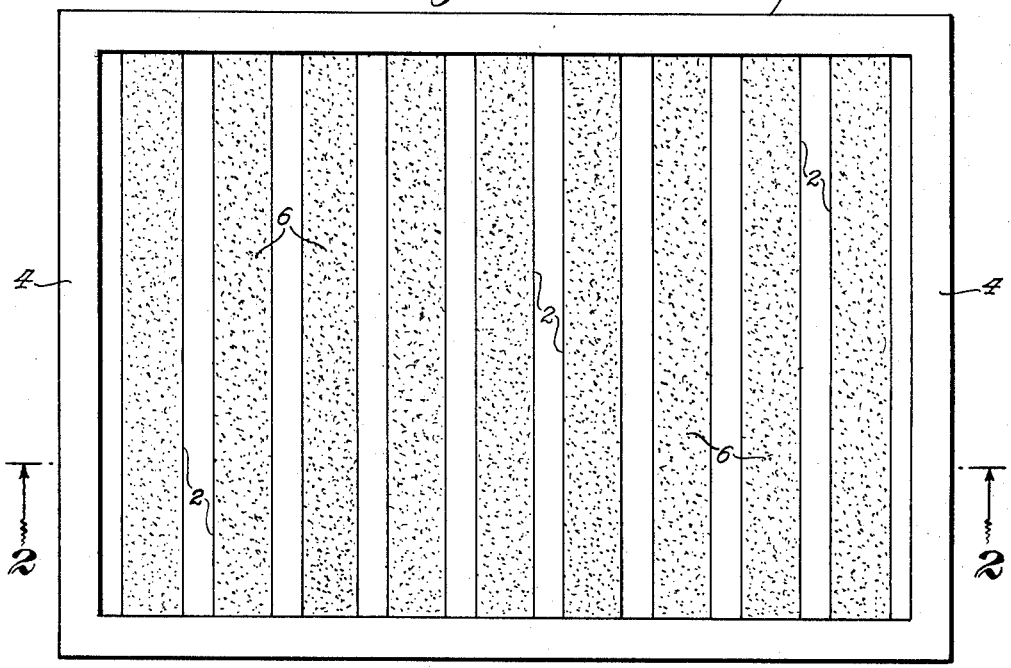
Figure 1 is a plan view of one embodiment of a filter constructed in accordance with the present invention.

Generally stated, in accordance with the present invention, a suitable support which, if it be desired to provide an acid resisting structure, may be formed of a suitable acid resisting material such as lead is provided with a plurality of relatively small recesses within each of which suitable fibrous filter material may be compacted. This invention relates particularly to the provisions of suitable supporting means for mounting filter material which may be termed non-self-sustaining such as for instance lead or asbestos wool. Such non-self-sustaining filter material may be suitably wedged or compacted in the recesses formed in a supporting structure and it will be understood that the degree of filtration desired may be regulated by the degree of compactness with which the filtering fibers are condensed into the recesses. Suitable drain openings are, of course, provided leading from the recesses in which the filter material has been mounted.

Referring now particularly to the drawing for an illustrative embodiment of this invention, a support 1 is provided, having therein a plurality of transversely extending grooves 2. It may be pointed out that in the case of acid resisting filters the support 1 may be a lead casting or may be formed of any other material sufficiently acid resisting for the purpose to which it is to be used. Extending from the body of the recess 2 through to the opposite side of the support 1, suitable drain openings such as 3 may be provided either in the form of holes or a narrow slot extending longitudinally of the recess 2. The support 1 is also provided with an elevated portion 4 extending about the edges thereof substantially above the recesses 2 in order to give the structure sufficient strength that it may be handled. Furthermore, in the event that the drain openings 3 are provided as longitudinal slots extending lengthwise of the recesses 2, it is apparent that the elevated portions 4 extend beyond the ends of the recesses 2 so that rib like elements 5, extending between the various drain openings 3 are united into a single structure. It will be apparent, therefore, that the rib like elements 5 extending between the drain openings 3 and the recesses 2 form the side walls and bottom of the recesses 2. It may be pointed out, however, that the recesses 2 need not extend for the entire width of the frame 1 but may be provided in any suitable size and shape.

Suitable filter material 6, which in the case of acid resisting filters, is preferably of a fibrous structure such as lead or asbestos wool may be compacted into the recesses 2 and wedged against the sides of the rib like elements 5, which form sustaining walls at the edge of the recesses 2, which are in the illustrated embodiment, in the form of grooves. It will be understood that the degree of compactness with which the filter material 6 is condensed or wedged into the recesses 2 may be varied to control the degree of filtration, but in any event, the filter material is preferably sufficiently compacted to cause the same to bridge across the drain openings 3.

Figure 2:
Figure 2 is a sectional view in side elevation taken along line 2—2 of Figure 1.
Figure 3:
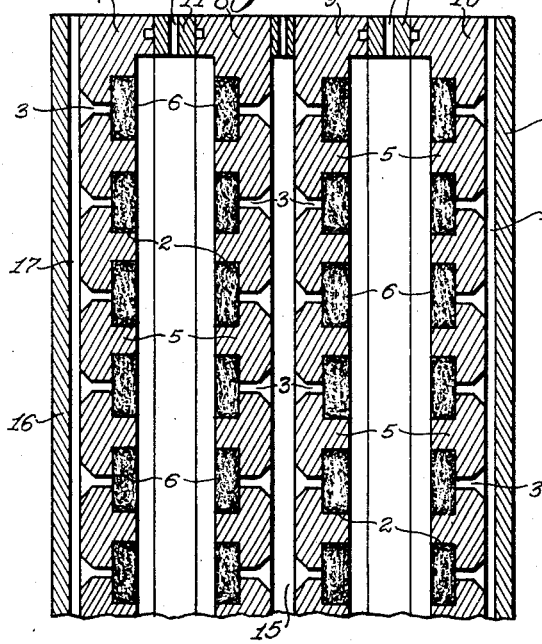
Figure 3 is a sectional view illustrating a plate and frame filter employing filter units constructed in accordance with the present invention.

Referring now to Figure 3 of the drawing, the application of the filter unit just described to the so-called plate and frame type of filter will be described. As is well known, the usual plate and frame type filter generally comprises two filter units arranged face to face so that the material to be filtered may be pumped in between the units and the filtered material collected at the outside thereof. In Figure 3, a plate and frame filter is shown which is provided with four filter units, 7, 8, 9 and 10, of the type illustrated in Figure 2. It will be apparent that the filter units 7 and 8 are arranged face to face and intermediate these filter units, a suitable frame such as 11 may be provided, having an opening 12 through which the material to be filtered may be pumped or otherwise forced, it being understood that the filter units of the present invention are as readily adaptable for use in connection with filters operating under vacuum as those which operate under pressure. Similarly, the filter units 9 and 10 are arranged face to face with a frame 13 therebetween having an opening 14 for conducting the material to be filtered between the filter units 9 and 10. In the embodiment illustrated, the backs of the filter units 8 and 9 may be suitably sealed together, or in fact the two units may be cast as an integral structure having suitable provisions such as an opening 15 therebetween adapted to collect the filtered material as it drains from the openings 3 of the respective filter units. Arranged adjacent the backs of the filter units 7 and 10 is a suitable collecting device such as, for instance, plates 16 having collecting recesses 17. With the arrangement just described, it is apparent that when the bodies of filtering material 6 provided in each of the respective filter units, become clogged the frames 11 and 13 may be removed and the respective units separated. With the respective units thus separated, it is apparent that the filter material is exposed and may be readily removed from the respective recesses for cleansing in any suitable manner. It may be pointed out that a filter constructed in accordance with the present invention is, however, not limited for use in connection with the plate and frame type filter just described, but is equally useful in connection with any other type of filter.

Figure 4:
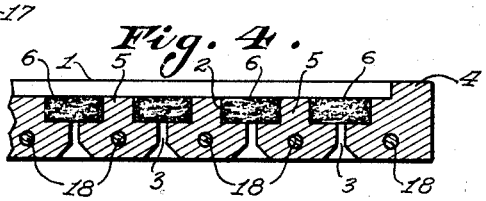
Figure 4 is a detail view similar to Figure 2 illustrating another modification of the invention in which is provided an acid resisting filter with a structurally reinforced support.

In Figure 4 of the drawing, a modification of the filter of the present invention is shown in which a structure particularly adaptable for large sized filters of the acid resisting type is provided. As above pointed out, when the filter of the present invention is to be used for the filtering of acids, the support 1 is preferably formed of a lead casting or other suitable acid resisting material. Such acid resisting material as lead does not, however, possess sufficient strength to permit units of relatively large size to be constructed without the use of a great amount of material which will render the filter unit of excessive weight. Accordingly a suitable strengthening frame which may be for instance formed of steel may be provided for use in connection with the acid resisting support for the filter material. In the embodiment illustrated in Figure 4, an arrangement of steel bars such as 18 may be formed, it being understood that such bars as 18 may extend not only through the respective rib like elements 5, but also about the edges of the support 1. Such strengthening members as 18 may be formed as a unitary frame prior to the casting of the support 1. With the strengthening frame 18 thus formed, the acid resisting material, such as lead, which forms the support 1 may then be cast about the frame 18 so that the strengthening members which may be termed relatively non-acid-resisting are either surrounded by the acid-resisting material such as lead or otherwise concealed so that the material to be filtered does not contact therewith.

From the foregoing description it is apparent that a filter structure has been provided which is particularly useful for filters adapted to filter acid or other corrosive materials, but it is to be distinctly understood that the filter of the present invention is not limited to use in connection with the filtration of acid materials, but that it is susceptible of general use in filtration. Furthermore, it is apparent that many modifications of the filter hereinbefore described will present themselves to those skilled in the art without departing from the spirit of the invention and it is to be distinctly understood, therefore, that the invention is not limited to the specific details which have been described or illustrated in the accompanying drawing. Moreover, it is to be understood that such modifications and the use of such individual features and sub-combinations of features as do not depart from the spirit of this invention are, although not specifically described herein, contemplated by and within the scope of the appended claims.

Having thus described the invention, what is claimed is:

1. A filter comprising, an acid resisting support having a plurality of parallel grooves, lands intermediate said grooves forming sustaining walls at the sides of said grooves and acid resisting wool compacted in the grooves and wedged against the sustaining walls to an extent sufficient to sustain the same therein.

2. A filter comprising, a frame covered with acid resisting material to provide a support, said support having a plurality of recesses with drain openings therefor, and loose fibrous acid resisting material removably packed in said recesses.

3. A filter comprising, a frame having a plurality of cross members and covered with acid resisting material to provide a supporting grid, said grid having a plurality of recesses therealong with drain openings for said recesses, and loose fibrous acid resisting material removably packed in said recesses.

HENRY A. WIENEKE.